United States Patent
Sowards

[11] 3,751,213
[45] Aug. 7, 1973

[54] HIGH INTENSITY RADIANT GAS BURNER
[75] Inventor: Donald Maurice Sowards, Ashbourne Hills, Claymont, Del.
[73] Assignee: E. I. duPont de Nemours and Company, Wilmington, Del.
[22] Filed: Nov. 19, 1971
[21] Appl. No.: 200,498

[52] U.S. Cl. ............................................ 431/328
[51] Int. Cl. ............................................ F23d 13/12
[58] Field of Search ..................... 431/328, 329

[56] References Cited
UNITED STATES PATENTS
3,044,538   7/1962   Honger ............................. 431/329
3,087,041   4/1963   Vonk ................................. 431/328
3,199,573   8/1965   Flynn ................................ 431/329
3,324,924   6/1967   Hailstone et al. ................ 431/328

*Primary Examiner*—Carroll B. Dority, Jr.
*Attorney*—Paul R. Steyermark

[57] ABSTRACT

A radiant heat gas burner comprising a radiant element formed of a refractory ceramic honeycomb, and a porous gas injection block formed of refractory fibers can be operated at high turn-down ratios and at high temperatures. Still higher operating temperatures can be reached when the combustion chamber is either completely or partially filled by refractory fibers.

14 Claims, 5 Drawing Figures

INVENTOR
DONALD M. SOWARDS

BY Paul A. Hagermark
ATTORNEY

HIGH INTENSITY RADIANT GAS BURNER

BACKGROUND OF THE INVENTION

This invention relates to high intensity radiant gas burners.

There are many types of radiant gas burners in use today, but most of them contain the following basic components: a gas inlet, a gas distribution chamber, a gas injection plate, a radiation element, and a combustion chamber, usually between the gas injection plate and the radiation element. The designs of such burners and the materials used in their construction vary to a greater or lesser extent, but the main objective always is to provide the highest possible temperature of the radiant element without at the same time causing deformation, cracking, or other physical damage of the burner's components.

U.S. Pat. No. 3,324,924 (to Hailstone et al.) discloses a radiant heat gas burner in which the radiant element is fabricated from a honeycomb-shaped ceramic structure. This construction is said to permit higher temperatures than those attainable with metal grid elements and, further, provides a multiplicity of combustion zones, thereby resulting in a high combustion efficiency.

The radiant heat gas burner of U.S. Pat. No. 3,324,924 uses a gas injection plate made of a uniformly perforated ceramic material, the injection plate being in contact with the honeycomb radiant element. The conventional "hot" plenum thus is eliminated.

Although prior art radiant heat burners, depending on their design and materials, could produce temperatures as high as about 1,200°–1,800° F. (about 649°–982° C.), higher temperatures of the radiant element often are required. There is a need, therefore, for a high intensity radiant heat gas burner which can be operated efficiently at high temperatures.

SUMMARY OF THE INVENTION

According to this invention, there is provided a very efficient high intensity radiant gas burner, which can be operated at temperatures as high as 3,200° F. (about 1,760° C) and higher. The burner has the usual components, namely, a gas and air injection means, a gas distribution chamber into which gas and air are delivered, an injection block, a "hot" plenum or combustion chamber, and a radiant element. The radiant element is a refractory ceramic honeycomb; the injection block is a porous material formed from refractory fibers; and the combustion chamber may be either partially or completely filled with loose refractory fibers.

DETAILED DESCRIPTION OF THE INVENTION

A radiant heat burner of the present invention can be built in many different configurations, shapes, and sizes, and using different materials of construction for their noncritical components. The invention will be better understood by reference to the drawings, all showing the preferred embodiment, where the combustion chamber is either completely or partially filled with refractory fibers.

Figure 1:
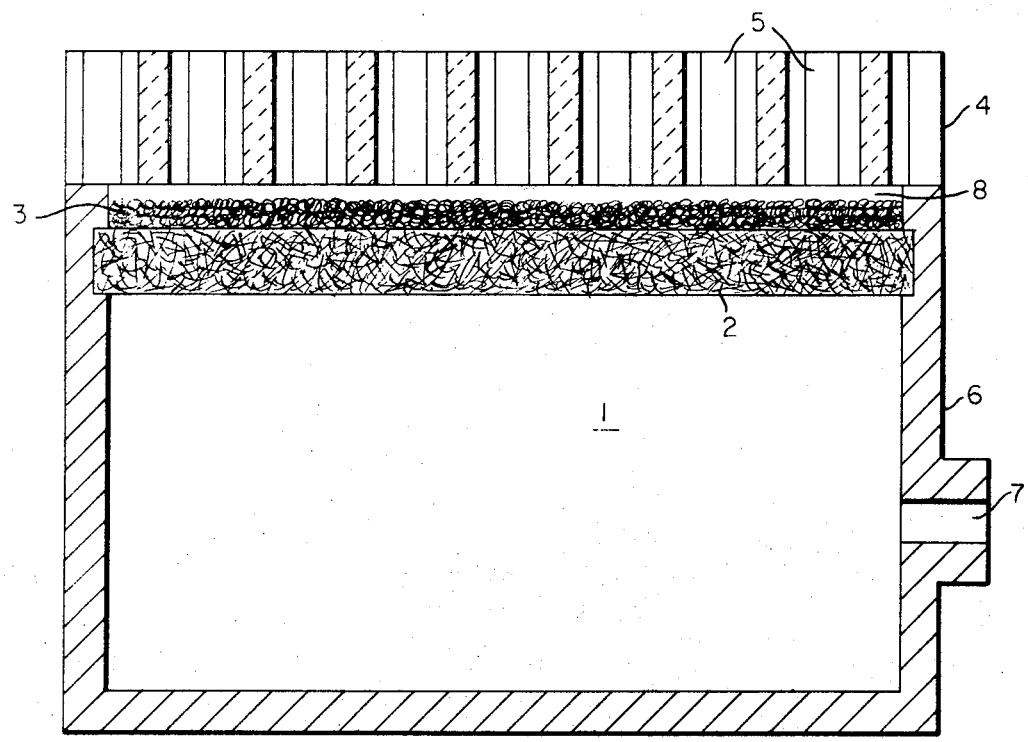
FIG. 1 represents a vertical cross-section of one possible radiant heat burner of the present invention.

In FIG. 1, the burner is shown as comprising a housing 6, an inlet 7 for introducing a mixture of gas and air to the gas distribution chamber 1, a porous gas injection block 2 formed from refractory ceramic fibers, to be described later, a combustion chamber 8, a loose layer or a batt of refractory ceramic fibers 3 within the combustion chamber, and a radiant element 4 formed of a refractory honeycomb. One surface of the porous gas injection block 2 forms a portion of the defining wall of the gas distribution chamber. The other surface forms a portion of the defining wall of the combustion chamber.

The term "combustion chamber" is used throughout this specification rather than the term "hot plenum." It is, of course, well understood that the actual combustion of the fuel also takes place within the cells of the honeycomb.

The thickness of the gas injection block 2 will vary with each specific burner design and will depend to some extent on the material density, which can vary from about 5 to 25 lb./cu.ft. The porosity of the material determines its permeability to gas flow. The gas flow is more uniform at lower densities. The thermal insulating properties of the block 2 also are better at lower densities, but the durability of the material is better at higher densities. The optimum density will be chosen on the basis of the above considerations. The thickness of the injection block 2 must be sufficient for adequate thermal insulation of the combustion chamber from the gas distribution chamber. Otherwise, gas could ignite prematurely in the gas distribution chamber.

The combustion chamber 8 will have a height of about one-sixteenth to 1 inch, the optimum height being about three-eighths inch. The inner surface of the radiant element 4 forms a portion of the defining wall of the combustion chamber.

Figure 2:
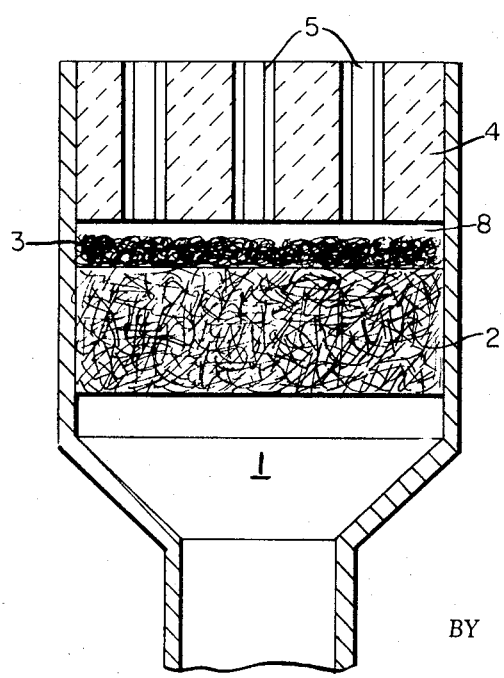
FIG. 2 represents a vertical cross-section of another radiant heat burner of the present invention.

The layer of refractory fibers 3 can either fill the combustion zone partially, for example, as shown in FIGS. 1 and 2, or completely. These fibers, which are assembled as a dry, loose fiber tow, have a bulk packing density of less than 1 lb./cu.ft. to 3 lb./cu.ft. One of the purposes of these fibers is to increase the turn-down ratio of the burner. The turn-down ratio can be defined as the ratio of the amounts of fuel which can be fed to the burner at the high and the low stable operating conditions. The turn-down ratio of a conventional radiant heat burner can be within the range of 4–8. The high intensity burner of the present invention, which contains the refractory fibers 3 in the combustion zone, can reach a turn-down ratio as high as 12–15. In the extreme case, no refractory fibers are placed in the combustion chamber, the only refractory fibers in the chamber being those on the surface of the injection block forming a portion of the defining wall of the combustion chamber. This case is illustrated in Example 4, below.

The housing 6 can be built of any convenient material, including cast iron and clay; and the size of the gas delivery chamber 1 is not critical. The side walls of the combustion chamber, between the gas distribution block and the refractory honeycomb, are made of a refractory material able to withstand the burner's temperature. The side walls need not be continuous and can be small spacer piers.

Figure 3:
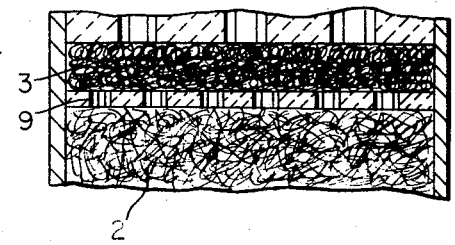
FIG. 3 represents a partial vertical cross-section of a radiant heat burner in which a ceramic honeycomb separates the gas injection plate from the combustion zone.

FIG. 3 shows a detail of another possible configuration of a radiant gas burner of the present invention, wherein a refractory honeycomb 9 is placed between the gas injection block 2 and the combustion chamber 8. This refractory honeycomb directs the incoming gas at an angle normal to the surface of the injection block and thus decreases gas scattering within the combustion chamber, with corresponding reduction of internal radiation.

Figure 4:
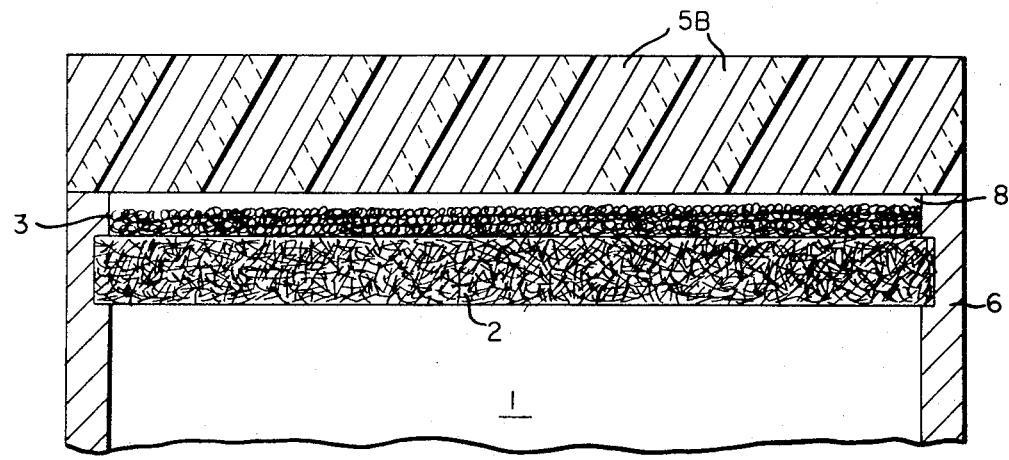
FIG. 4 is a partial vertical cross section of a radiant heat burner of the invention to which the cells of the radiant element are slanted relative to the face of the element.
Figure 5:
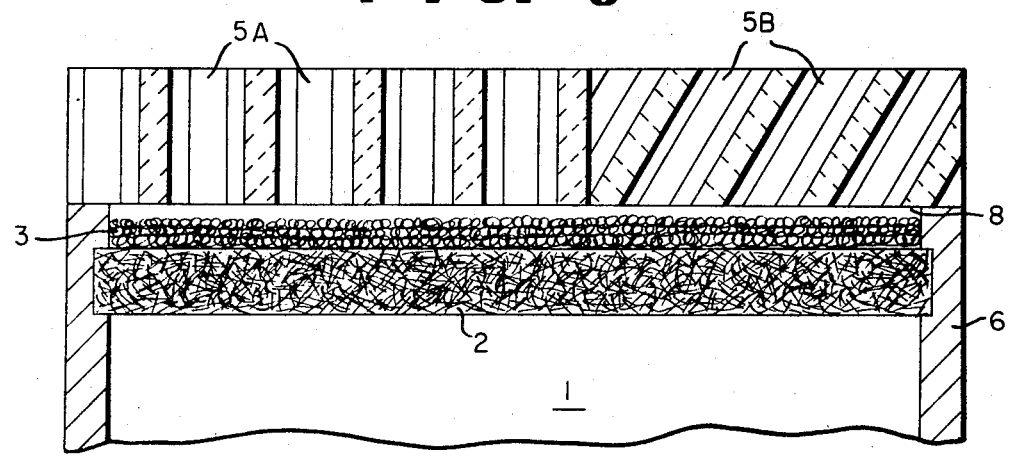
FIG. 5 is a partial vertical cross section of a radiant heat burner of the invention in which some of the cells are so slanted.

FIGS. 4 and 5 illustrate two other embodiments of the invention in which all or some of the cells of the radiant elements are slanted relative to the honeycomb open surface of the element.

Methods for making the honeycomb structures used as radiant elements in the burner of this invention are known in the art. One suitable method is disclosed in British Patent 931,096. This method comprises forming a plasticized raw material mix containing finely divided sinterable particles of a refractory material, plasticizing ingredients and volatile viscosity adjustment media into a thin film or sheet material. The sheet material is then corrugated and honeycomb structures are fabricated by placing sheets together so that the nodes of one sheet are in contact with nodes of another corrugated sheet or with a non-corrugated sheet. The structure is then fired to sintering temperatures. Examples of sinterable materials which can be used are alumina, zirconia, cordierite, zircon, barium titanate and magnesia.

Another suitable method for making the honeycomb structures is disclosed in U.S. Pat. No. 3,112,184. In this method a suspension containing pulverized ceramic material and a binder is coated on each side of a flexible carrier. The carrier is corrugated and the corrugated material is used to fabricate honeycomb structures. The green structure is then fired to sinter the ceramic particles. As described in the patent, the purpose of the carrier is to provide support for the unfired coating to allow it to be formed to the desired shape prior to the firing step. The carrier can be either an inorganic or organic material although the latter is preferred since it burns out on firing and does not appear in the final product. Also, preferred for use as carriers according to this method are fibrous materials containing a multitude of holes which pass through the carrier from one surface to the opposite surface and which can be completely filled by the ceramic slurry to produce an unlaminated wall upon firing.

A particularly suitable method for making the honeycomb structures is that disclosed in Belgian Patent 612,535, issued July 11, 1962. In this method aluminum foil is fabricated into a honeycomb structure of the desired shape and is fired under controlled conditions to oxidize the aluminum to alpha alumina. Prior to the firing step the aluminum foil is coated with an agent, identified in the patent as a fluxing agent, which serves to prevent inhibition of oxidation due to oxide scum formation on the surface of the aluminum. Examples of fluxing agents disclosed in the patent as being suitable include alkali metal and alkaline earth metal oxides and precursors of these oxides, i.e., compounds which yield the oxides on firing. A particularly suitable agent is sodium oxide which is applied as sodium silicate.

The honeycomb products resulting from this process are substantially pure alpha alumina. If desired, the chemical composition of the structures can be modified by including in the coating composition finely divided particles of filler refractory oxide. The filler refractories may, if desired, be one or more of those which will react with the alumina as it is formed. If a reactive filler such as magnesia and/or silica is used, the honeycomb structure will contain the corresponding reaction product such as spinel, cordierite or mullite. The products of this process are characterized by outstanding strength and thermal shock resistance.

As disclosed in the Belgian patent, the honeycomb structures may be fabricated by corrugating sheets of aluminum foil coated with fluxing agent and placing the coated sheets together node to node. Where sodium silicate solution is used as the fluxing agent, the body will have sufficient green strength to maintain its shape until it is fired. Alternatively, the honeycomb structure may first be fabricated from the aluminum foil using methods well known in the art and described in the patent literature. Suitable prefabricated aluminum honeycomb structures for use in this process are available commercially and may be purchased from Hexcel Corporation or Bloomingdale Rubber Division of American Cyanamid, both of Havre de Grace, Md.

An improvement in the process for making honeycomb structures by the method of the Belgian patent is disclosed in U.S. Pat. No. 3,473,938 (to Oberlin). In the process of this patent the composition used to coat the aluminum honeycomb structure contains, in addition to the fluxing agent and filler refractory, if any, small amounts of a vanadium compound. The products of the Belgian patent are characterized by having a double-walled structure. The double-wall results from the fact that the aluminum foil, as it melts, flows outwardly through the oxide formed on the outer surfaces of the foil and is oxidized at the outer surface of the oxide layer, thus leaving a large void in the final product corresponding approximately in thickness to the thickness of the original aluminum foil. The inclusion of the vanadium compound in the coating composition causes the formation of bridges of refractory material between these double walls, resulting in a product having even greater strength and thermal shock resistance than the products of the Belgian patent.

The structural design parameters for the honeycomb radiant elements are the diameter of the cells and the thickness of the walls of the cells.

The diameter of the cells 5 of the honeycomb can vary from about one-sixteenth to one-fourth inch. A cell diameter of about one-eighth inch has been found to be most practical for the radiant elements used in the burners of the present invention. Structures with smaller cell diameters than one-sixteenth inch can be used but are more difficult to fabricate. Structures having cells larger than about one-fourth inch are ordinarily not desirable, simply because they become too bulky for convenient use. As will be discussed below, it is desirable that the honeycomb element have a cell length-to-diameter ratio in the range of about 8:1 in order to efficiently collimate the radiation and to provide radiant emissivity conditions approaching those of a "black" body. Thus, where the cell diameters are greater than about one-fourth inch, the thicknesses of the structure required to provide the desired length-to-diameter ratio will be so great as to make the structure too bulky for ease of handling and installation. Furthermore, as the cell diameter increases, the unit becomes more susceptible to flame blowout by cold drafts.

The range of cell diameters given above are the nominal sizes, i.e., ignoring the wall thickness. It is perhaps more accurate to say that, as a practical matter, the number of cells per inch will range from a lower limit of about 2⅔ cells per inch to a maximum of about 15 cells per inch. Wall thicknesses will vary from a minimum of about 0.005 in., where a honeycomb structure having 15 cells per inch is used, to a maximum of about 0.10 in., where a honeycomb structure having 2⅔ cells per inch is used. Of course the wall thickness in a honeycomb structure having 15 cells per inch can be greater than the minimum stated but it should be less than that necessary to provide a structure having an open area normal to the cell axes of at least about 40 percent. Similarly, the wall thickness in a structure having 2⅔ cells per inch can be less than the maximum but the thickness must be great enough to provide a structure with a maximum open area normal to the cell axes of about 95 percent.

As indicated above, the ratio of cell length to diameter in the honeycomb-shaped radiant elements is an important design factor. It is well known that the effective emissivity of a cavity such as a honeycomb cell approaches unity as the ratio of the length to the diameter of the cavity increases. In other words, the radiation characteristics of honeycomb cells approach those of a "black" body as the ratio of length to diameter increases. It was shown, for instance, in U.S. Pat. No. 3,324,924 that at identical b.t.u. input and other operating conditions, the output of radiant heat energy translated into electrical energy almost doubled on increasing the length-to-diameter ratio from 2:1 to 10:1.

It is to be understood that, while FIGS. 1, 2 and 3 show all the ceramic honeycomb cells parallel to the gas stream and normal to the honeycomb open surfaces, the cells can also be either completely slanted as shown at 5B and 5A in FIG. 5 or slanted in part and normal in part as shown at 5B and 5A in FIG. 5. The choice of the proper refractory honeycomb for the radiant element can be easily made by an engineer familiar with radiant gas burners.

The refractory fibers which can be used to form the injection block 2 and the loose fiber batt 3 can be made of any refractory material, capable of withstanding temperatures in the neighborhood of 1,760° C. and above. Usually, such fibers will be made of alumina, but certain highly refractory silica or zirconia fibers also could be used. Several types of alumina fibers either are presently on the market and can be readily obtained from commercial sources, or can be prepared according to published processes. The manufacturers of alumina fibers include, among others, Tyco Corporation, Union Carbide Corporation, and Babcock & Wilcox Co. Alumina fibers have been disclosed in U.S. Pat. Nos. 3,082,099, 3,385,915, and 3,180,741. Zirconia fibers can be obtained from Union Carbide Corporation.

The injection block 2 is conveniently formed by filtering at a reduced pressure a slurry of the fibers in water and drying the resulting filter cake either at ambient temperature or at an elevated temperature. The thickness of the slurry is so adjusted that a filter cake of desired porosity is obtained. Usually the concentration of the fibers in the slurry will vary from about 1 to 5 weight percent. Although the dry filter cake has sufficient mechanical strength to be cut and shaped as required, it is more practical to choose the equipment so that a dry filter cake of the proper size and shape will be formed. The porosity of the injector block material should be such as to allow a pressure drop of the gas and air mixture on passing into the combustion zone of about 2-20 psig.

When a radiant gas burner of this invention is also provided with a refractory honeycomb insert 9, adjacent to the injection block 2, as shown in FIG. 3, the construction and cell diameters of this insert are the same as those described above for the radiant elements. However, the cell length-to-diameter ratio is much less critical in this case. The thicknes of the honeycomb insert 9 can vary within rather broad limits but usually will be from one-eighth to one-half inch. In this case, the cells will be normal to the open surfaces of the honeycomb.

In the operation of a radiant gas burner of the present invention, a fuel and air mixture is introduced into the gas distribution chamber 1 through the port 7. While separate gas and air inlets can be used satisfactorily, an injection nozzle is usually preferred. The fuel is a hydrocarbon gas, such as natural gas, a $C_1$–$C_4$ saturated hydrocarbon, or a mixture of $C_1$–$C_4$ saturated hydrocarbons. Such hydrocarbons include methane, ethane, propane, and butane. The burner of the present invention can also be provided with an evaporator in the gas distribution chamber. When an evaporator is provided, the burner can also be used with certain liquid fuels such as light naphthas.

The air and fuel components of the mixture are usually injected in their stoichiometric ratio, minor deviations, of the order of plus or minus 10 percent, being acceptable. With a larger excess of the fuel, the resulting fuel waste would be economically undesirable, and an environment pollution hazard would be created by the presence of either unburned or incompletely burned fuel in the exhaust gases. A larger excess of air also is undesirable because it may cause cooling of the combustion chamber below the optimum temperature range, and because a larger volume of air would require larger and more expensive pumps, which would thus operate at only fractional efficiency.

The burner of this invention is stable in operation over a wide range of feed rates of the gas/air mixture. The efficiency of the burner is of the order of 35 to 70 depending primarily on the desired operating temperature. Efficiency is defined as the ratio of radiant heat leaving the burner to the calorific value of the gas entering the burner. The burner of this invention is useful for space heating and for domestic or industrial heating applications. The refractory radiant element can be modified by the presence of suitable substances to alter the wavelengths of the radiation from those normally emitted by the refractory at given temperatures. Thus, the radiant element can be designed so as to emit visible light. Compounds of zirconium, cerium, thorium, manganese, copper, cobalt, calcium, barium, strontium, lithium, sodium, potassium, and the like can be used for this purpose. These substances can be coated on the fired radiant element or can be included as components of the unfired structure.

This invention is now illustrated by representative examples of certain preferred embodiments thereof.

EXAMPLE 1

An injector block, 2 inches by 2 inches and three-fourths inch thick, was prepared as a filter cake by vacuum filtration of a suspension of alpha alumina fibers in water. The fibers were about 0.008 inch in diameter by one-fourth to 1 inch in length. The slurry contained 4.8 percent fibers by weight and the thickness of the cake was attained by adding the proper amount of slurry during the filtration. The dried density of the injector block was 11.3 pounds per cubic foot.

The injector block was attached with refractory cement as the cover of a cast iron box, equipped with gas and air inlet tubes, to form a cold plenum 2½ inches deep. The refractory cement casing was extended up the sides and three-eighths inch above the top of the injector block to form the walls of the combustion chamber.

A ¼ inch thick disc of alumina fibers, about 1 to 2 inches long, was formed in the bottom of the combustion chamber by loosely sprinkling fibers, often moistening with aluminum chlorohydrate, into the hot plenum cavity. The aluminum salt serves to bind the loosely packed fibers together. The packing density of this disc is about 0.6 pounds per cubic foot.

A radiant element was provided by laying a 2¼ inch by 2¼ inch piece of alpha alumina ceramic honeycomb, one inch thick with ⅛ inch diameter cells, upon the edges of the extended refractory cement rim.

Using natural gas, with a rating of about 1,040 BTU/cu.ft., mixed with 10 volumes of air, this burner began to show stable performance at a total gas flow rate of about 25 cu.ft./hr. and continued to operate well up to a flow above 200 cu.ft./hr. The hot plenum temperature as indicated with an optical pyrometer ranged from 1,200° to 1,760° C. with increasing gas flow.

A 12-inch diameter copper water calorimeter, with a carbon black front coating, indicated a radiant heating efficiency of near 70 percent at lower temperatures, decreasing to 38 percent at the highest temperature. This is measured as the BTU content of the natural gas feed relative to the BTU required to raise the water temperature in the calorimeter to the measured level.

EXAMPLE 2

A burner was constructed as in Example 1, except the combustion chamber walls were formed with high temperature refractory blocks and the combustion chamber was one-half inch thick. Zirconia fibers (Union Carbide Corp.) and alumina fibers containing 6 to 8 weight percent of chromium, manganese, or cobalt, added as the respective oxides, were also tested as fillers for the combustion chamber. About 1 gram of loose fiber was placed in the hot plenum cavity and covered with the ceramic honeycomb. The fibers thus filled the combustion chamber. With a gas flow of 115 cu.ft./hr. the following results were obtained for several plenum packings:

| Combustion Chamber Additive | Combustion Chamber Temperature,°C. | Heating Efficiency, % |
|---|---|---|
| Alumina, only | 1450 | 67 |
| Alumina with chromium | 1650 | 56 |
| Alumina with manganese | 1750 | 44 |
| Alumina with cobalt | 1600 | 57 |
| Zirconia | 1550 | 60 |

EXAMPLE 3

A burner similar to that of Example 1 was constructed, except that a 3/16 inch thick disc of manganese doped honeycomb replaced the fiber packing in the combustion chamber. This was not attached to the injector block (whose density was 14 lbs./ft.³) but was laid loose on its surface.

At a total gas flow of 150 cu.ft./hr., the combustion chamber temperature was 1,685° C. and the heating efficiency was 54 percent.

EXAMPLE 4

A 1¼ inch thick injector block was prepared using zirconia fibers. It had a density of 22 lbs./cu.ft. This was used in a burner similar to that of Example 1, except no loose fiber was placed in the combustion chamber.

With a total gas flow rate of 140 cu.ft./hr. the combustion chamber temperature was 1,420° C. and the heating efficiency was 64 percent.

EXAMPLE 5

The burner of Example 2 with alumina fibers in the combustion chamber was used, except that 1⅜ inches thick honeycomb with 3/16 inch cells and 2 inches thick honeycomb with ¼ inch cells were used as the radiant element.

At a total gas flow rate of 125 cu.ft./hr. the following results were obtained:

| Radiant Element | Combustion Chamber Temp. | Heating Efficiency |
|---|---|---|
| 3/16" cell | 1510°C. | |
| ¼" cell | 1485°C. | 36% |

I claim:

1. A radiant heat gas burner comprising:
   a. a housing;
   b. at one end of the housing, a radiant element formed from a ceramic, refractory, open-celled honeycomb;
   c. a combustion chamber, a portion of the defining wall of said chamber being formed by one surface of said radiant element;
   d. a gas injection system comprising a porous block formed from refractory ceramic fibers having a density of about 5 to 25 lb./cu.ft., one surface of said system forming a portion of the defining wall of the combustion chamber;
   e. at the other end of the housing, a gas distribution chamber, a portion of the defining wall of said chamber being formed by another surface of the gas injection system, said chamber being fitted with a means for the introduction of gas and air.

2. The radiant heat gas burner of claim 1 wherein the gas injection system is constituted of the porous block formed from refractory fibers.

3. The radiant heat gas burner of claim 1 wherein the number of cells in the radiant heat element is comprised within the range of 2⅔ to 15 per inch; the open cell area of said element normal to the cell axes is within the range of about 40 to 95 percent; and the length-to-diameter ratio of the cells is at least 2:1.

4. The radiant heat burner of claim 1 wherein the cells of the element are slanted to the honeycomb open surfaces.

5. The radiant heat burner of claim 1 wherein the cells of the radiant element are slanted in part and normal in part to the honeycomb open surfaces.

6. The radiant heat gas burner of claim 1, wherein the combustion chamber is filled to at least part of its height with a loose tow of refractory fibers, the packing density of the fibers being less than 1 lb./cu.ft. to 3 lb./cu.ft. of bulk material.

7. The radiant heat gas burner of claim 6 wherein the gas injection system is constituted of a planar refractory ceramic honeycomb structure in contact with the porous block formed from refractory fibers, so arranged that the surface of said porous block opposite to the surface defining a portion of the combustion zone is in contact with one end of each cell of the honeycomb structure, the cells of the honeycomb being normal to its open surfaces.

8. The radiant heat burner of claim 6 wherein the refractory fiber tow completely fills the combustion chamber.

9. The radiant heat burner of claim 6 wherein the refractory fiber tow in the combustion chamber is alumina fibers.

10. The radiant heat gas burner of claim 1 wherein the height of the combustion zone is one-sixteenth to 1 inch, and the cell diameter of the radiant element is one-sixteenth to one-fourth inch.

11. The radiant heat gas burner of claim 10 wherein the cell length-to-diameter ratio of the radiant element is about 8:1.

12. The radiant heat burner of claim 10 wherein the porous injection block is made of alumina fibers.

13. The radiant heat burner of claim 1 wherein the porosity of the porous gas injection block is such that the pressure drop of the gas and air mixture on passing from the gas distribution chamber into the combustion chamber is about 2–20 psig.

14. The radiant heat burner of claim 13 wherein the thickness of the ceramic honeycomb in the gas injection system is about one-eighth to one-half inch.

* * * * *